(12) United States Patent
Bhattiprolu et al.

(10) Patent No.: US 8,001,482 B2
(45) Date of Patent: Aug. 16, 2011

(54) METHOD OF DISPLAYING TAB TITLES

(75) Inventors: Sukadev Bhattiprolu, Beaverton, OR (US); Haren Myneni, Tigard, OR (US); Malahal R. Naineni, Tigard, OR (US); Chandra S. Seetharaman, Portland, OR (US); Narasimha N. Sharoff, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 11/963,768

(22) Filed: Dec. 21, 2007

(65) Prior Publication Data

US 2009/0164934 A1 Jun. 25, 2009

(51) Int. Cl.
*G06F 3/048* (2006.01)
(52) U.S. Cl. .......................................... 715/777; 715/779
(58) Field of Classification Search .................. 715/777, 715/779, 821, 825, 840
See application file for complete search history.

(56) References Cited

U.S. PATENT DOCUMENTS

| | | | |
|---|---|---|---|
| 5,757,371 A * | 5/1998 | Oran et al. ..................... | 715/779 |
| 2006/0036950 A1* | 2/2006 | Himberger et al. ........... | 715/732 |
| 2006/0036965 A1* | 2/2006 | Harris et al. .................. | 715/777 |

* cited by examiner

*Primary Examiner* — Weilun Lo
*Assistant Examiner* — Truc T Chuong
(74) *Attorney, Agent, or Firm* — Dillon & Yudell LLP

(57) ABSTRACT

A method of displaying tab titles in a computer user interface receives a request to display a new tab in a tab area having a length. The new tab has a width and the new tab has a title having a length. The method determines a number of tabs to be displayed in the area and determines if the number of tabs to be displayed multiplied by the tab width is greater than the length of the tab area. If so, the method sets the tab width equal to the length of the tab area divided by the number of tabs. The method determines if the length of the title is greater than the tab width. If so, the method determines if the title has any words in common with any other titles of tabs. If so, the method deletes the common words from the titles, and displays the titles with the deleted common words in the tabs. The method may set a maximum number of tabs to be displayed in the tab area. The maximum number of tabs may be determined by the length of the tab area and a minimum tab width. If the number of tabs is greater than the maximum number of tabs is to be displayed, the method collapses some of the tabs in to a tab of tabs.

14 Claims, 3 Drawing Sheets

METHOD OF DISPLAYING TAB TITLES

BACKGROUND OF THE INVENTION

1. Technical Field

The present invention relates generally to the field of computer user interfaces, and more particularly to a method of displaying tab titles when there are too many tabs to be displayed in the area available for tabs.

2. Description of the Related Art

The tab metaphor provides a popular and powerful method of displaying information in computer system graphical user interfaces. Graphical tabs, analogous to file folder tabs, provide handles to information. A user accesses information by selecting the tab associated with the information.

The information associated with a tab is identified by a title displayed on the tab. In many instances, a title may be longer than the width of a tab. Currently, whenever the title is too long to fit in the tab, the system truncates the title. Since there is only a limited amount of screen or window real estate available to tabs, as more tabs are added to the display, the widths of the tabs must be reduced. As the width of a tab is reduced, more and more of the title must be truncated. The more a title is truncated, the less information it provides. With large numbers of tabs, their titles may be so severely truncated as to make the titles ineffective to distinguish one tab from another.

SUMMARY OF THE INVENTION

Embodiments of the present invention provide methods of displaying tab titles in a computer user interface. The method receives a request to display a new tab in a tab area having a length. The new tab has a width and the new tab has a title having a length. The method determines a number of tabs to be displayed in the area and determines if the number of tabs to be displayed multiplied by the tab width is greater than the length of the tab area. If so, the method sets the tab width equal to the length of the tab area divided by the number of tabs. The method determines if the length of the title is greater than the tab width. If so, the method determines if the title has any words in common with any other titles of tabs. If so, the method deletes the common words from the titles, and displays the titles with the deleted common words in the tabs.

Embodiments of the present invention may set a maximum number of tabs to be displayed in the tab area. The maximum number of tabs may be determined by the length of the tab area and a minimum tab width. If the number of tabs is greater than the maximum number of tabs is to be displayed, the method collapses some of the tabs in to a tab of tabs.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
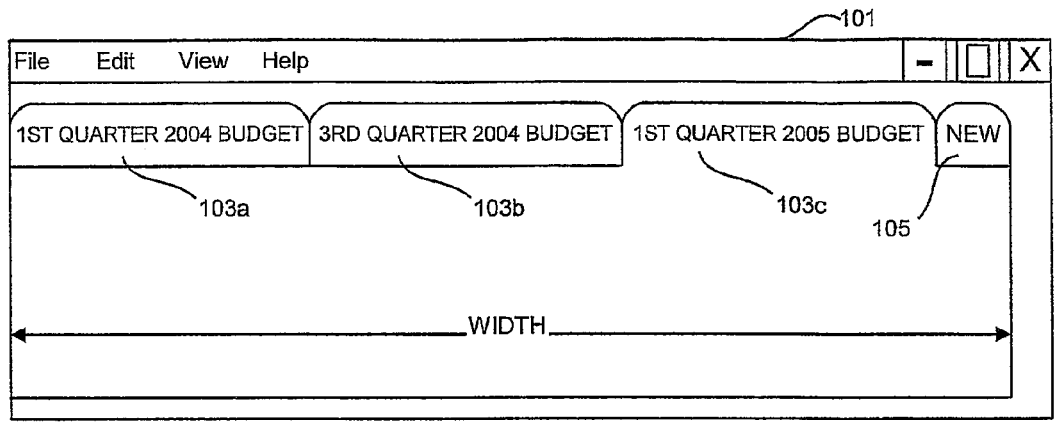
FIG. 1 illustrates a first view of an embodiment of a tabbed user interface according to the present invention.

Referring now to the drawings, and first to FIG. 1, a tabbed computer user interface is shown in window 101. Tabbed user interfaces are well known in the art and they are based on the metaphor of tabbed physical file folders. Each tab is associated with information and the information may be surfaced in window 101 by clicking on its tab. Window 101 may be displayed on any suitable computer, such as a personal computer, notebook computer, or the like.

In FIG. 1, window 101 displays three information tabs 103 and new tab control 105. Each tab 103 has a title. The title of tab 103a is 1ST QUARTER 2004 BUDGET. The title of tab 103b is 3RD QUARTER 2004 BUDGET. The title of tab 103c is 1ST QUARTER 2005 BUDGET. New tab control 105 allows a user to add a new tab to window 101.

Tabs 103 are displayed in a tab area having a length equal to the width of tabbed user interface less the width of new tab control 105. Tabs 103a-103c fill the entire available length of the tab area. If new tabs 103 are added to the tabbed user interface, the width of each tab 103 must be reduced. Since the titles of tabs 103a-103c fill the horizontal width of their respective tabs, if the width of the tab is reduced, the titles will not fit.

Figure 2:
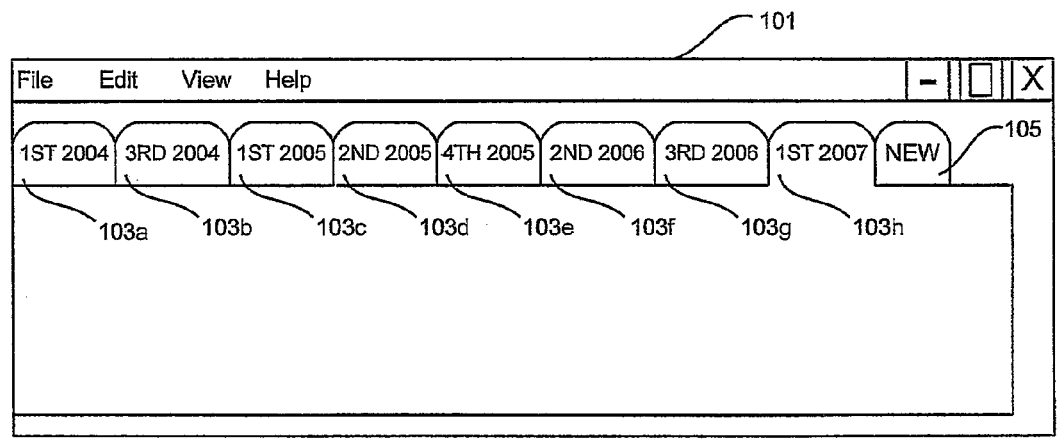
FIG. 2 illustrates a second view of an embodiment of a tabbed user interface according to the present invention.

FIG. 2 illustrates window 101 in which new tabs 103d-103h have been added according to an embodiment of the method of the present invention. The width of each tab 103 has been reduced such that the number of tabs 103 times the width of each tab 103 is less than the available length of the tab area of the user interface. Also, according to an embodiment of the present invention, the respective length of each title has been reduced to fit its associated tab by deleting words of the title that are common with other titles. In this example, the words "quarter" and "budget" are common to all titles. Thus, in FIG. 2, the words quarter and budget have been deleted from the titles. The remaining words of the title of each tab 103a-103h are sufficient to differentiate the tabs.

Figure 3:
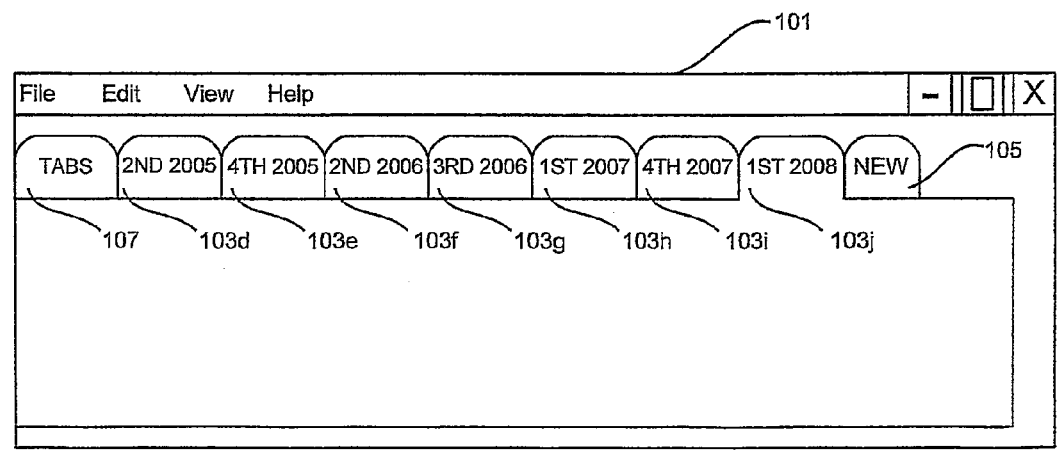
FIG. 3 illustrates a third view of an embodiment of a tabbed user interface according to the present invention; and, FIGS. 4A and 4B comprise a flow chart of an embodiment of processing according to the present invention.

FIG. 3 illustrates window 101 in which new tabs 103i and 103j have been added according to an embodiment of the method of the present invention. New tabs 103i and 103j would not fit into the available length of the tab area without reducing the widths of tabs 103a-103j. According to an embodiment of the present invention, a minimum tab width is established. In the example of FIG. 3, the minimum tab width is established such that the respective titles of the tabs fit into their respective tabs. The minimum tab width establishes a maximum number of tabs that can be displayed. In order to accommodate tabs 103i and 103j, a tab of tabs 107 is inserted into the user interface and tabs 103a-103c are collapsed into tab 107. Tabs 103a-103c may be viewed by opening tab of tabs 107. In order to maintain the maximum number of tabs displayed, opening tab 107 to expose tabs 103a-103c will cause three of tabs 103d-103j to collapse into tab 107.

Figure 4A:
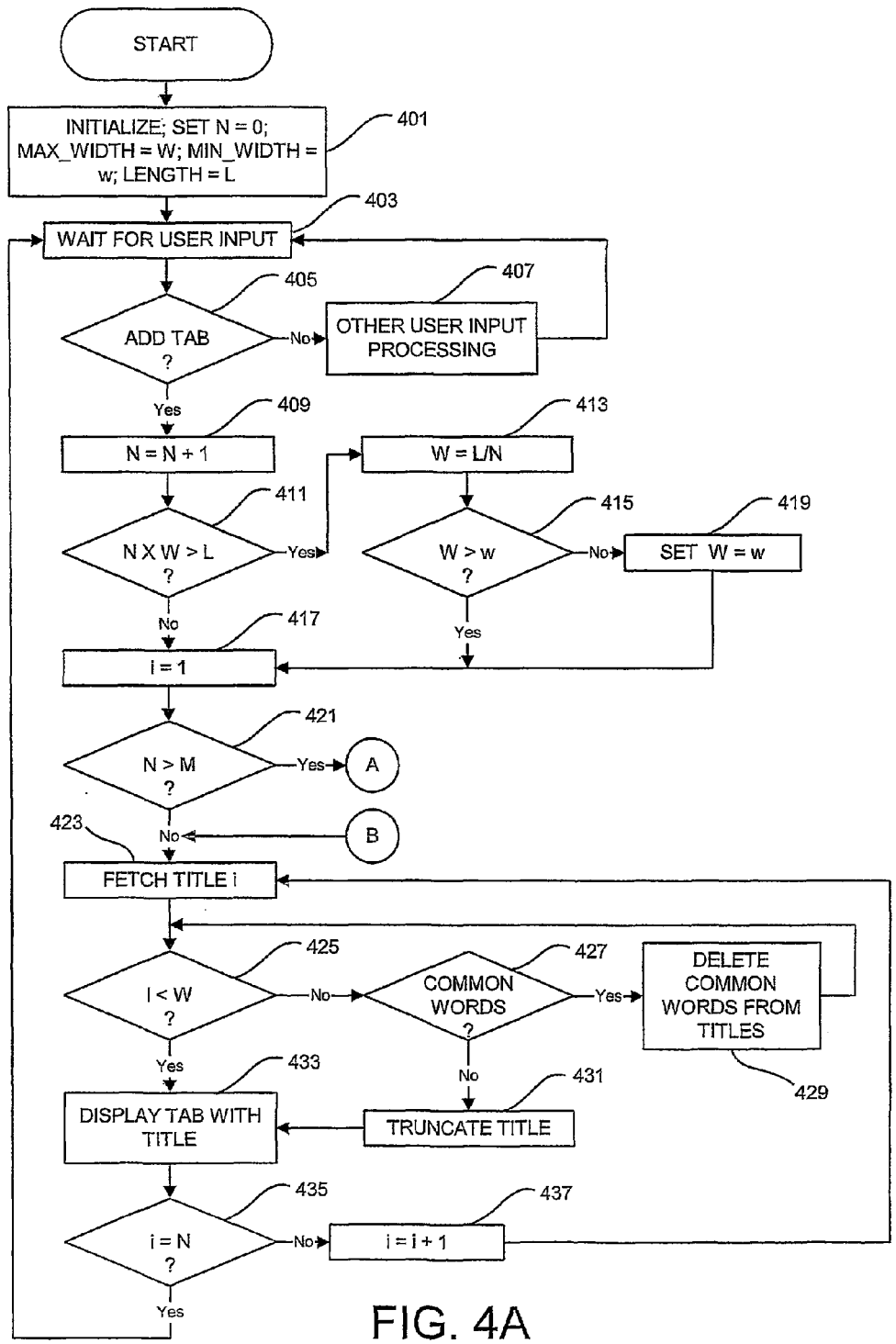
Figure 4B:
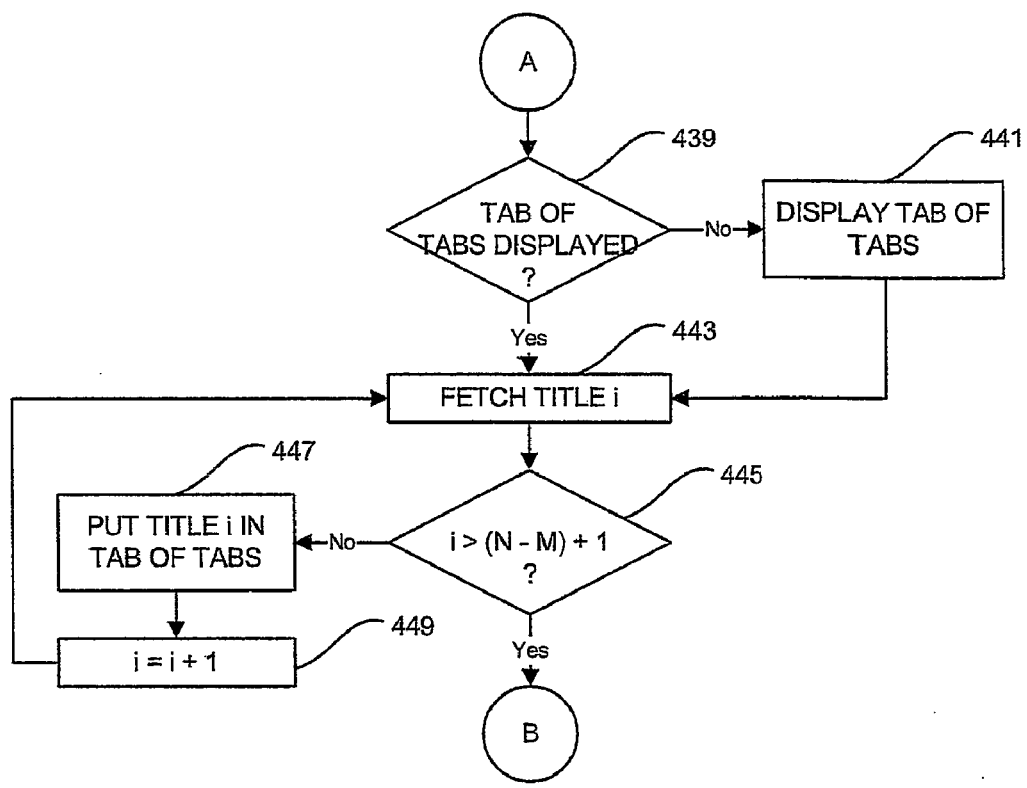

FIGS. 4A and 4B comprise a flow chart of an embodiment of processing according to the present invention. The method is initialized at block 401 and the number of tabs N is set equal to zero, a maximum or initial tab width is set equal to W, a minimum tab width is set equal to w, and the length of the area available for tabs is set equal to L. The minimum tab width w may be fixed arbitrarily, or it may be set dynamically based upon a minimum useful tab title length. Then, the method waits for user input, as indicated at block 403. If, as determined at decision block 405, the user input is not adding a tab, the method performs other user input processing, as indicated generally at block 407. If the user input is adding a tab, the method sets N=N+1, at block 409. Then, the method determines, at decision block 411, if the number N of tabs multiplied by the width W established for each tab is greater than the length L of the tab area. If so, the method sets width W equal to length L divided by the number N of tabs, at block 413. The method then determines, at decision block 415, if width W is greater than minimum tab width w. If so, the method sets a tab index i equal to one, at block 417. If, as determined at decision block 415, width W is not greater than minimum tab width w, the method sets W equal w, at block 419.

After setting tab index i equal to one, at block 417, the method determines, at decision block 421 if the number N of tabs is greater than the maximum number M of tabs that can be displayed. The maximum number M is determined with reference to the minimum tab width w and the length L of the tab area. If N is greater than M, processing proceeds to FIG. 4B, as will be described below. If not, the method fetches the title i, as indicated at block 423. The method determines, at decision block 425, if the length l of the title is less than the width W established for a tab. If not, the method determines, at decision block 427, if there are any common words in the tab titles. If so, the method deletes the common words from the titles, as indicated at block 429, and processing returns to decision block 425. If there are no common words, the method truncates the title, at block 431. If, as determined at decision block 425, the length l of the original title or the title with common words deleted is less than the width W established for the tab, or, as determined at decision block 427, there are no common words and the title is truncated at block 431, the method displays the tab with the title, as indicated at block 433. Then, the method determines, at decision block 435 if index i is equal to the number of tabs N. If not, the method sets index i=i+1, at block 437, and processing returns to block 423. Processing continues to loop through blocks 423-437 until all tabs have been processed.

Referring now to FIG. 4B, the method determines, at decision block 439, if the tab of tabs is displayed. If not, the method displays the tab of tabs, at block 441. Then, the method fetches title i, as indicated at block 443. Then, the method determines, at decision block 445, if i>(N−M)+1. If not, the method puts title i in the tab of tabs, at block 447, and sets i=i+1, at block 449. FIG. 4B processing loops through blocks 443-449 until i>(N−M)+1, whereupon processing returns to block 423 of FIG. 4A.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of displaying tab titles within a tabbed user interface of an application window displayed on a computer, which comprises:
   while the user interface of the application window is being displayed on the computer, receiving a request to display a new tab in a tab area of the user interface of the window, wherein said new tab has a title having a title length and an initial width corresponding to the title length and wherein the tab area has a tab area length that is equal to a width of the tabbed user interface less a width of a new tab control;
   the computer determining a total width of a number of tabs, including the new tab, to be displayed in said tab area;
   determining if the total width of said number of tabs to be displayed is greater than the length of said tab area;
   if the total width of said number of tabs to be displayed is greater than the length of said tab area:
      determining if said title length of said new tab is greater than a tab width available to the new tab;
      if said title length of said new tab is greater than said tab width, determining if said title has any words in common with any other titles of other tabs;
      if said title has any words in common with any other titles of other tabs, deleting said common words from said title and from the other titles; and
      displaying said title and the other titles within the tabs without including said deleted common words in said tabs.

2. The method as claimed in claim 1, further comprising:
if said title length of said new tab is less than said tab width, displaying said title in said new tab.

3. The method as claimed in claim 1, further comprising:
determining a maximum number of tabs to be displayed in said tab area;
if a number of tabs to be displayed, including the new tab, is greater than said maximum number of tabs, collapsing some of said tabs in to a tab of tabs.

4. The method as claimed in claim 3, further comprising:
displaying said tab of tabs and a number of tabs equal to said maximum number of tabs minus one within the tab area.

5. The method of claim 1, further comprising:
the computer determining if a number of tabs to be displayed is greater than a maximum number of tabs that can be displayed within a tab area of the user interface; and
if said number of tabs to be displayed is greater than said maximum number of tabs that can be displayed, collapsing some of said tabs into a tab of tabs.

6. The method of claim 1, further comprising:
displaying said new tab along with other tabs, including the tab of tabs when the number of tabs to be displayed is greater that the maximum number of tabs.

7. The method of claim 1, further comprising:
displaying said tab of tabs, said new tab, and a number of other tabs equal to said maximum number of tabs minus two within the tab area.

8. The method of claim 1, further comprising:
in response to receipt of a selection to open the tab of tabs to expose the individual tabs within the tab of tabs, collapsing a next set of tabs into the tab of tabs to maintain the maximum number of tabs displayed.

9. The method of claim 1, further comprising:
setting a tab width for each of the tabs equal to said length of said tab area divided by said number of tabs;
checking the tab width against a pre-established minimum tab width, which minimum tab width determines a maximum number of tabs that are supported within the tab area, which maximum number is calculated as the length of the tab area divided by the pre-established minimum tab width; and
in response to the tab width being at least as wide as the pre-established minimum tab width, adjusting a length of each title for each tab to fit within the tab width by performing one or more of: (a) truncating a title when the title is too large to fit within the tab width; and (b) deleting common words of titles, leaving remaining words that are sufficient to differentiate the tabs from each other.

10. A method of displaying tabs within a computer display, the method comprising:

receiving, at a tabbed user interface of a window displayed on a computer, a request to display a new tab, wherein said new tab has a title having a title length and an initial width corresponding to the title length;

the computer determining if a number of tabs to be displayed is greater than a maximum number of tabs that can be displayed within a tab area of the tabbed user interface; and if said number of tabs to be displayed is greater than said maximum number of tabs that can be displayed, collapsing some of said tabs currently displayed within the tab area of the tabbed user interface of the application window into a tab of tabs: and if said title length of said new tab is greater than a tab width available to the new tab within the tabbed user interface, adjusting a length of one or more titles for one or more tabs to fit within the tab width by performing one or more of: (a) truncating a title when the title is too large to fit within the tab width; and (b) deleting common words of titles, leaving remaining words that are sufficient to differentiate the tabs from each other.

11. The method as claimed in claim 10, further comprising:
displaying said new tab along with other tabs, including the tab of tabs when the number of tabs to be displayed is greater that the maximum number of tabs.

12. The method as claimed in claim 10, further comprising:
displaying said tab of tabs, said new tab, and a number of other tabs equal to said maximum number of tabs minus two within the tab area.

13. The method of claim 10, further comprising:
in response to receipt of a selection to open the tab of tabs to expose the individual tabs within the tab of tabs, collapsing a next set of tabs into the tab of tabs to maintain the maximum number of tabs displayed.

14. the method of claim 10, wherein said adjusting a length of each title comprises:

setting a tab width for each of the tabs equal to said length of said tab area divided by said number of tabs; and checking the tab width against a pre-established minimum tab width, which minimum tab width determines a maximum number of tabs that are supported within the tab area, which maximum number is calculated as the length of the tab area divided by the pre-established minimum tab width; and wherein deleting common words from titles comprises reducing said title length by deleting common words from said title and from other titles of other tabs, and displaying said title and the other titles within the tabs without said deleted common words.

* * * * *